Jan. 21, 1930.            F. TAUREL            1,744,591
MACHINE FOR MAKING VERMICELLI AND SIMILAR PRODUCE
Filed Jan. 20, 1926      2 Sheets-Sheet 1
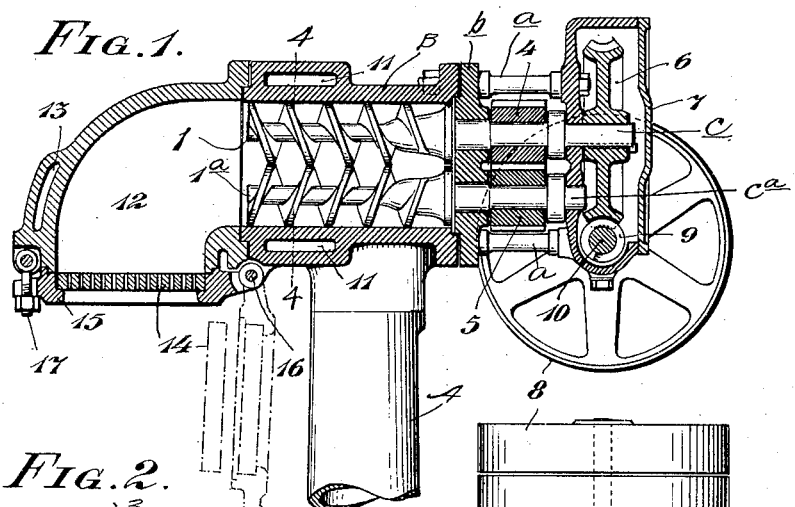
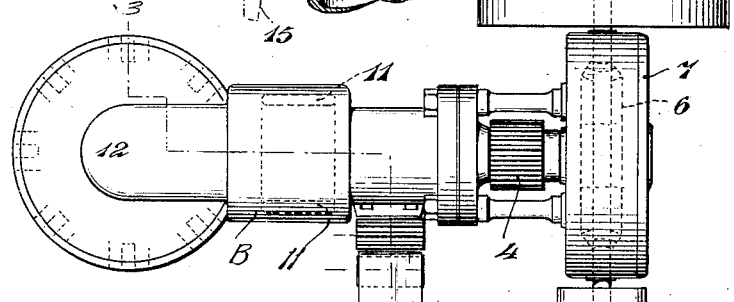
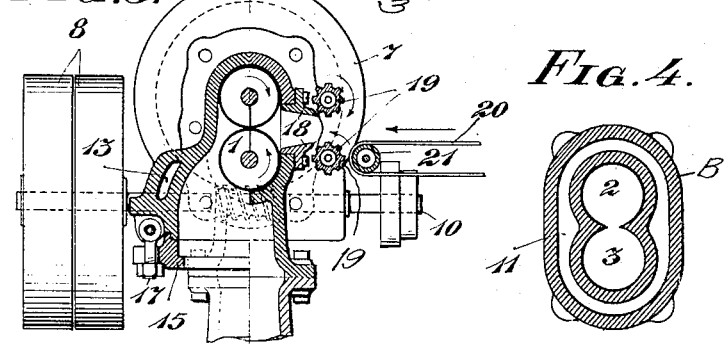
Inventor
FERNANDO TAUREL
By Attorney Jan. 21, 1930.   F. TAUREL   1,744,591
MACHINE FOR MAKING VERMICELLI AND SIMILAR PRODUCE
Filed Jan. 20, 1926   2 Sheets-Sheet 2

INVENTOR
FERNANDO TAUREL
BY
ATTORNEYS

Patented Jan. 21, 1930

1,744,591

UNITED STATES PATENT OFFICE

FERNANDO TAUREL, OF BUENOS AIRES, ARGENTINA

MACHINE FOR MAKING VERMICELLI AND SIMILAR PRODUCE

Application filed January 20, 1926. Serial No. 82,554.

The invention relates to machines for manufacturing vermicelli and other nutritive pastes or dough in the form of either solid or tubular bodies.

An object of the invention is to provide a machine of the character indicated in which the nutritive qualities, aroma and flavor of the product will be preserved.

Another object of the invention is to provide means whereby the passage of the paste or dough through the matrix is facilitated.

A further object of the invention is to provide means for supporting the matrix, which permits it to be readily applied and removed and which permits the matrix to be cleaned without stopping of the machine.

Other objects and advantages reside in certain novel features of the construction and arrangement of parts, which will be hereinafter fully described and pointed out in claims, reference being had to the accompanying drawings forming part of the specification, and in which:

Figure 1 is an elevation partly in section of a machine embodying the invention.

Figure 2 is a plan view.

Figure 3 is a sectional view on line 3—3 of Figure 2.

Figure 4 is a sectional view on line 4—4 of Figure 1, with the compressing and feed screws removed.

Figure 5:
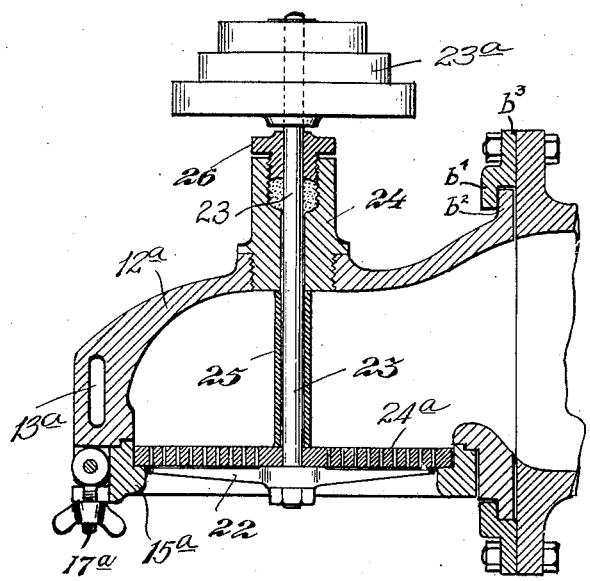
Figure 5 is a detail sectional view of a modification.

Referring to the drawing, A is a support upon which the machine is mounted. B is a chambered body preferably formed with two chambers 2 and 3 as shown in Figure 4. In the chambers 2 and 3 are mounted two compressing and feed screws 1 and $1^a$, which turn in opposite directions. The body B is closed at its rear end by the plate $b$ and this plate is secured to the body by bolts $a$, the rear ends of which are secured to the housing 7, and support it in spaced relation to the body. The shafts $c$, $c^a$ of the screws 1, $1^a$ are mounted in the plate $b$ and housing 7. On the shafts $c$, $c^a$ of the feed screws between the plate $b$ and the housing are mounted the pinions 4 and 5 meshing with each other.

The shaft $c$ has mounted thereon in the housing the worm wheel 6 which meshes with the worm 9 on the shaft 10 mounted in the housing and having at one end pulleys 8 by means of which the shaft 10 is operated. Secured to the rear end of the body B and opening into the chambers 2 and 3 thereof is the mouthpiece 18. At each side of the mouthpiece a fluted roller 19 is mounted and disposed adjacent the lower roller is an endless feed apron 20, mounted on rollers 21, only one of which is shown.

In order to prevent the paste or dough from being over heated in its passage through the chambers 2 and 3 and thereby its nutritive qualities and flavor impaired, the body B is provided with the annular channel 11 in which a cooling medium such as cold water is circulated.

To the front of the body B the member 12 is secured and into which the paste or dough is delivered and compressed by the screws 1 and $1^a$. The member 12 is provided with a channel 13 through which a heating medium such as hot water or steam is circulated. By this means the dough or paste is heated, thereby facilitating the passage of the paste or dough through the matrix.

The holder for the matrix 14 is in the form of a ring 15 hinged to the body B at 16 and held in a closed position by bolts 17 pivoted to the member 12 and engaging notches in the ring. By disengaging the bolts from the notches of the ring, the ring with the matrix can be swung to the position shown in dotted lines in Figure 1, when the matrix can be cleaned or removed and a different one substituted.

The operation is as follows:

The shaft 10 being rotated by the pulleys 8, the worm 9 meshing with the worm wheel 6, the shaft $c$ of the screw 1 will be rotated and the pinion 4 meshing with the pinion 5 on shaft $c^a$ of screw $1^a$ will also be rotated, but in the opposite direction to that of screw 1. The paste or dough being placed on the apron 20 is fed by the rollers 19 through the mouthpiece 18 into the chambers 2 and 3 and is fed through the chambers by the screws 1 and $1^a$ and forced into the member 12 and from said member through the openings of the matrix 14. It is understood that during the operation a cooling medium is circulated in the channel 11 in the body and a heating medium circulated in the channel 13 of the member 12, for the purpose before described.

In the modification shown in Figure 5, the member $12^a$ into which the paste or dough is fed, is mounted on the body so as to permit it to be turned into different positions, and below the matrix $24^a$ a rotary cutter 22 is mounted for cutting the vermicelli into small pieces. To permit the turning of the member $12^a$, it is provided at its inner end with a flange $b^2$ and body B has secured to it the ring $b^3$, which is offset and has the inwardly projecting portion $b^4$, between which and the body the flange $b^2$ of the member $12^a$ extends. By this means the member $12^a$ turns on a horizontal axis so that it can be turned to permit its outlet end to project vertically or laterally. The matrix $24^a$ is carried by a ring $15^a$ held in a closed position on the outlet $12^a$ by the bolts $17^a$. The cutters 22 are mounted on the shaft 23 below the matrix $24^a$. The shaft 23 is mounted in a removable bearing 24 in the top of the member $12^a$ and carries on its outer end a stepped pulley $23^a$ to permit the cutter 22 to be operated at different speeds. The bearing 24 is preferably provided with a stuffing box 26. To prevent the paste or dough from contacting with the shaft 23, a sleeve 25 surrounds the shaft 23. The member $12^a$ is provided with a channel $13^a$ for the circulation of a heating medium as in the outlet 12. When it is desired not to use the cutters, the bearing 24, shaft 23, sleeve 25 and cutters 22 can be removed, and the opening from which the bearing 24 has been removed closed by a plug. It is to be understood that the plug must be flush with the inner face of the member $12^a$.

I claim:

1. In a machine of the character described, a casing having an open end, a matrix attached thereto, a pair of feed screws extending longitudinally in the casing and arranged one above the other, one of the side walls of the casing having a material inlet opening for directing material between the screws, and means for feeding material in a longitudinal direction through the inlet opening.

2. In a machine of the character described, a casing having an open end, a matrix attached thereto, a pair of feed screws extending longitudinally in the casing and arranged one above the other, one of the side walls of the casing having a material inlet opening for directing material between the screws, and a pair of spaced parallel rollers arranged in advance of the inlet opening for directing the material therethrough.

FERNANDO TAUREL.